United States Patent
de Oliveira Alves, Jr. et al.

(10) Patent No.: US 11,869,387 B2
(45) Date of Patent: Jan. 9, 2024

(54) FLIGHT SIMULATOR WITH A VISUAL SYSTEM INTEGRATED IN A ROBOTIC MANIPULATOR

(71) Applicants: EMBRAER S.A., São José dos Campos-SP (BR); ITA—Instituto Tecnológico de Aeronáutica, São José dos Campos-SP (BR)

(72) Inventors: Marco Antonio de Oliveira Alves, Jr., São José dos Campos-SP (BR); Edmar Thomaz da Silva, São José dos Campos-SP (BR); Sergio Duarte Penna, São José dos Campos-SP (BR); Luís Gonzaga Trabasso, São José dos Campos-SP (BR); Emilia Villani, São José dos Campos-SP (BR); Alfredo Rocha, São José dos Campos-SP (BR); Carlos Cesar A. Eguti, São José dos Campos-SP (BR); Wesley Rodrigues de Oliveira, São José dos Campos-SP (BR); Wilson da Cunha Lara Junior, São José dos Campos-SP (BR); Guilherme Sartori Natal, São José dos Campos-SP (BR); Guilherme Boulhosa Rodamilans, São José dos Campos SP (BR)

(73) Assignees: EMBRAER S.A., São José dos Campos (BR); ITA—Instituto Tecnologico de Aeronáutica, São José dos Campos (BR)

(*) Notice: Subject to any disclaimer, the term of this patent is extended or adjusted under 35 U.S.C. 154(b) by 20 days.

(21) Appl. No.: 17/122,836

(22) Filed: Dec. 15, 2020

(65) Prior Publication Data

US 2021/0192969 A1 Jun. 24, 2021

Related U.S. Application Data

(60) Provisional application No. 62/949,919, filed on Dec. 18, 2019.

(51) Int. Cl.
  *G09B 9/12* (2006.01)
  *B25J 13/06* (2006.01)
  (Continued)

(52) U.S. Cl.
  CPC .............. *G09B 9/12* (2013.01); *B25J 13/065* (2013.01); *G09B 9/326* (2013.01); *B25J 11/00* (2013.01)

(58) Field of Classification Search
  CPC .. G09B 9/12; G09B 9/326; B25J 13/06; B25J 13/065; B25J 11/00
  See application file for complete search history.

(56) References Cited

U.S. PATENT DOCUMENTS

| 4,016,658 A | 4/1977 | Porter et al. |
| 4,390,253 A | 6/1983 | Lobb |

(Continued)

FOREIGN PATENT DOCUMENTS

| CN | 203084972 U | 7/2013 |
| CN | 104731103 B | 10/2017 |

(Continued)

OTHER PUBLICATIONS

"KUKA The control system of the future_KR C4" (Kuka.com 2016) (14 pages).

(Continued)

*Primary Examiner* — Timothy A Musselman
(74) *Attorney, Agent, or Firm* — Nixon & Vanderhye PC

(57) ABSTRACT

One example non-limiting example provides a full representative part 25 commercial aircraft flight deck with a visual system integrated with a robotic manipulator to provide an immersive simulation environment for training and research purposes. Such technology provides an architecture that provides visual blending-warp adjustment along with visual system integration, including for example (Continued)

Spherical screen design, Structural design and Projectors allocation.

14 Claims, 17 Drawing Sheets

(51) Int. Cl.
*G09B 9/32* (2006.01)
*B25J 11/00* (2006.01)

(56) References Cited

U.S. PATENT DOCUMENTS

| | | | | |
|---|---|---|---|---|
| 6,106,298 | A * | 8/2000 | Pollak | G09B 9/16 434/30 |
| 8,241,038 | B2 * | 8/2012 | Quinn | G09B 9/00 434/30 |
| 9,470,967 | B1 * | 10/2016 | Vorst | H04N 9/3147 |
| 10,780,587 | B2 | 9/2020 | Riedel | |
| 2005/0044810 | A1 * | 3/2005 | Schipani | G09F 15/0068 52/646 |
| 2013/0108992 | A1 * | 5/2013 | Buelthoff | G09B 9/46 434/33 |

FOREIGN PATENT DOCUMENTS

| | | |
|---|---|---|
| DE | 102010035814 B3 | 12/2011 |
| WO | 2020117037 A1 | 6/2020 |

OTHER PUBLICATIONS

Ruiz, "Design and Analysis of a Stewart-Platform-Based Six-Axis Load Cell" (Jun. 2017), pp. 1-43.
Furtado et al., "DTW: a design method for designing robot end-effectors", Journal of the Brazilian Society of Mechanical Sciences and Engineering, pp. 871-885, vol. 36, Springer Nature Switzerland AG Oct. 15, 2013) Design to Weight, DOI https://doi.org/10.1007/s40430-013-0109-8 (abstract enclosed).
Bettini et al., "Design to center of gravity (DT_CG): a design method applied to robot end-effectors", Journal of the Brazilian Society of Mechanical Sciences and Engineering, vol. 40, Article No. 266, Springer Nature Switzerland AG (Apr. 27, 2018) DOI https://doi.org/10.1007/s40430-018-1183-8 (abstract enclosed).
Barco, "F50 WQXGA Compact 120 Hz, single-chip DLP projector with WQXGA resolution" (Jun. 17, 2019).
"FAR 121 Subpart N—Training Program", 14 CFR 121, 35 FR 90 (Jan. 3, 1970).

* cited by examiner

FLIGHT SIMULATOR WITH A VISUAL SYSTEM INTEGRATED IN A ROBOTIC MANIPULATOR

CROSS-REFERENCES TO RELATED APPLICATIONS

This application claims priority from U.S. provisional patent application No. 62/949,919, filed Dec. 18, 2019 entitled "Flight Simulator with a Visual System Integrated in a Robotic Manipulator", incorporated by reference for all purposes.

STATEMENT REGARDING FEDERALLY SPONSORED RESEARCH OR DEVELOPMENT

N/A

FIELD

The technology herein relates to flight simulators, and more particularly to flight simulators within a visual system integrated in a robotic manipulator.

BACKGROUND & SUMMARY

A flight simulator artificially simulates aircraft flight and the environment in which the aircraft flies. Flight simulators are often used as a critical step in testing new aircraft designs. They often replicate the control laws that govern how aircraft fly, how the aircraft reacts to applications of flight controls, the effects of other aircraft systems, and how the aircraft reacts to external factors such as air density, turbulence, wind shear, cloud, precipitation, etc. Flight simulation is used for a variety of reasons, including flight training (mainly of pilots), the design and development of the aircraft itself, and research into aircraft characteristics and control handling qualities. See "FAR 121 Subpart N—Training Program", 14 CFR 121.

While some training type flight simulators are primary electronic, many flight simulators used to test aircraft design include physical platforms for changing the position and orientation of the aircraft assembly. One prior flight simulator approach is to use the so-called Stewart Platform in a parallel hexapod configuration with 6 linear hydraulic or electrical actuators. The Stewart platform design is extensively used in flight simulators, particularly in the full flight simulator which requires all 6 degrees of freedom ("DOF"). In Stewart Platform based flight simulators developed by Redifon, the payload is often a replica cockpit and a visual display system, normally of several channels, show the outside-world visual scene to the aircraft crew that are being trained. The replica cockpit is mounted on the Stewart Platform, which positions and moves the replica cockpit in 6 DOF. See e.g., Maria Rosa Ruiz, Design and Analysis of a Stewart-Platform-Based Six-Axis Load Cell (MIT June 2017); CN104731103B; CN203084972U; DE102010035814; WO2020117037; U.S. Pat. Nos. 4,016,658; and 4,390,253. While such efforts have been made in the past, they often have been unduly expensive and have not resulted in a high-fidelity representation of actual flight.

It would be highly desirable to develop a robotic based flight simulator with fidelity level representative of a real aircraft, with an optimized aircraft product development cycle. Such a system would be able to evaluate the criticality during a flight campaign, optimize product development and provide training in a Flight Simulator having high fidelity representation and low operation cost, providing advantages including:

Multiplatform Flight Simulator having high fidelity and low operation cost (i.e., modular construction so the same flight simulator can be used interchangeably with multiple different cockpits)

Optimize the product development cycle

Optimize the development Flight Mechanics and control law (CLAW) performance

Application for Upset Recovery condition.

Once depicted through the figures and descriptions above it is important to emphasize that the present non-limiting technology has the following advantages among others:

High fidelity flight mechanic model in a less complex assembling flight simulator—when compared with a hexapod level D configuration described above. The high-fidelity model is implemented in this type of flight simulator with much less complexity assembling than a Stewart platform.

Motion-based system in a less complex flight simulator when compared with a hexapod flight simulator configuration. As one implementation uses a robot arm, the configuration is much simpler than a Stewart platform, which has 6 hydraulic actuators, and limited degree of freedom when compared with a robotic arm degree of freedom.

Contribution to a reduced development cycle product. Nowadays a flight simulator is an essential tool to support the aeronautic development cycle. A low and/or middle cost flight simulator, as this in a robotic arm, having a representative visual system, will reduce the time of technical development.

DETAILED DESCRIPTION OF EXAMPLE NON-LIMITING EMBODIMENTS

Figure 1:
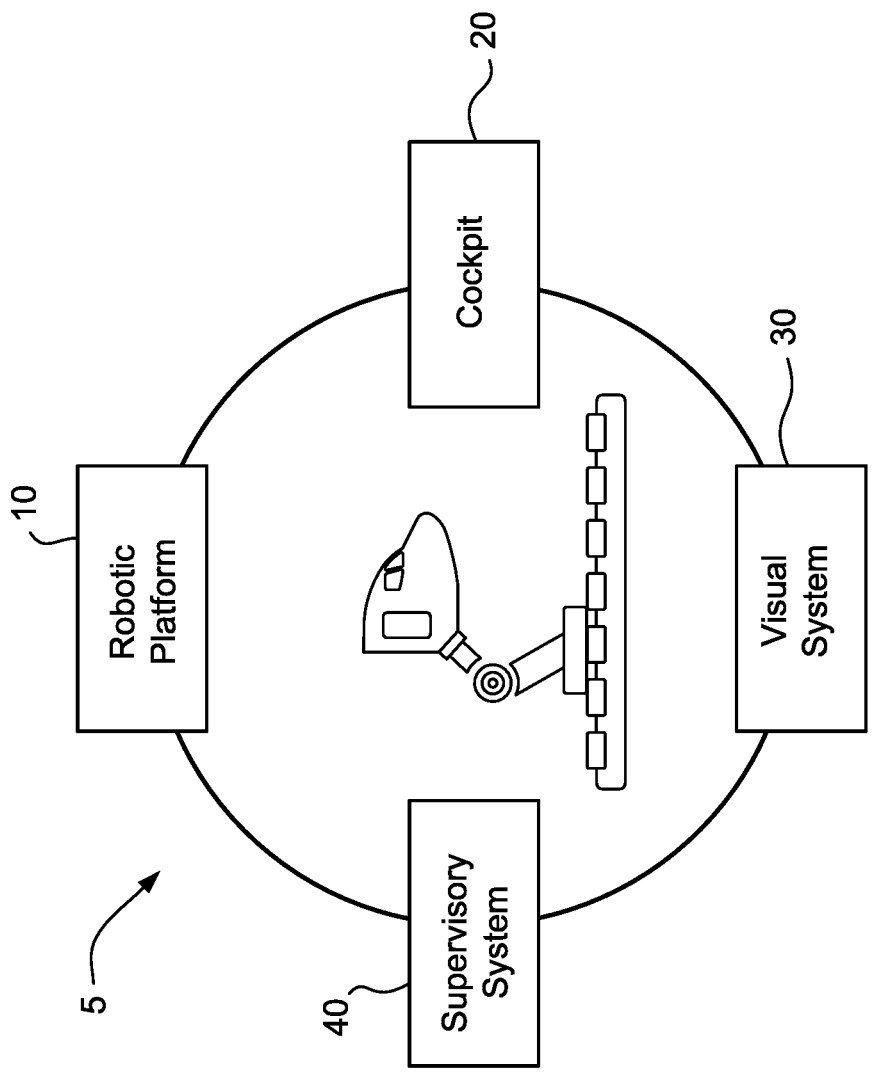
FIG. 1 shows main constituent systems of example embodiments.

One example non-limiting example provides a full representative part 25 commercial aircraft flight deck with a visual system integrated with a robotic manipulator to provide an immersive simulation environment for training and research purposes. Such technology provides an architecture that provides visual blending-warp adjustment along with visual system integration, including for example:
  Spherical screen design
  Structural design
  Projectors allocation (i.e., allocation of plural projectors to different parts of the spherical screen).

Based upon this mindset, a visual system complies with Level 7 and D requirements of the FAA's 14 CFR Part 60. With this kind of integration, requirements such as visual latency, spherical structures, and field of view in horizontal and vertical direction are provided in order to operate with the robotic motion platform and resulting in flight simulator fidelity capable of complying with a high-fidelity flight simulator.

Another design point is the structural design and payload optimization. The total weight and global structure are designed without jeopardizing the dynamic behavior of this type of flight simulator.

The flight simulator based on robotic manipulator exists in one embodiment for researching purpose only without visual system integrated on the cockpit frame which complies with Level 7 and D requirement of FAA's 14 CFR Part 60. The reason is the payload constraints which gives, in a first glance, some challenging issues to qualify this type of flight simulator. Along these lines, the example non-limiting technology herein provides a structural design strategy that allows the integration of a commercial jet full representative flight deck with a visual system in a robotic manipulator. The mechanical structure allows the integration of the embedded visual system, cockpit mockup and systems' components by means of the techniques DTW ("Design to Weight", DOI: https://doi.org/10.1007/s40430-013-0109-8) and DTCG ("Design to Center of Gravity", DOI: https://doi.org/10.1007/s40430-018-1183-8). This strategy overcomes the payload restrictions imposed by the robotic motion platform and the development is done for a robot of the shell that solves manufacturing aeronautic problems.

Using the DTW and the DTCG techniques, several iterations of structural Finite Element Analysis and Robot Payload Analysis may be carried out for each new proposition of geometry, dimensions and materials. A topological analysis, which considers different distribution of mass, materials and geometry of the screen according to the main required resonant modes and geometric projection requirements, may be carried out to evaluate the best proposition from the structural point of view.

Upon these analyses, the structure may be configured as single linked rigid body, comprised of a carbon fiber screen and carbon fiber trusses.

An example embodiment provides an adjustable-tensioning mechanism in each interaction joint in each pair of tubes/screen sections, which is based on a tensional bolt-nut mechanical arrangement that allows stretching the assembly to adequate or enable its vibrating/compliant modes.

The final design may be validated in terms of total mass and equivalent center of gravity position by means of a dynamic model of the robot arm that shows that each joint actuator is not subject to an excessive torque for the maximum robot acceleration condition.

Example Non-Limiting Overall System

With these characteristics as background, the main constituent systems of an example embodiment 5 are pictorially described in FIG. 1. Features of each system 5 are described below.

Robotic platform 10 consists in one embodiment of a six degree of freedom anthropomorphic robotic arm (e.g., KUKA KR 1000), with 1 ton payload capacity and a 10 meters linear unit (rail) 100 the robot can move upon. The robotic system 10 therefore has seven degrees of freedom (pitch, yaw, roll, up/down, forward/backward, left/right, and linear movement along the rail). The seventh degree of freedom introduced by the linear rail 100 adds complementary features that increase simulator fidelity since the linear rail 100 is responsible to enhance the forces sensed on the pilot body due to forward and backward displacement. Example movement ranges of the different degrees of freedom axes may be:

| Axis  | 1     | 2         | 3          | 4     | 5     | 6     | 7   |
|-------|-------|-----------|------------|-------|-------|-------|-----|
| Range | ±150° | +15/−130° | +145/−110° | ±350° | ±118° | ±350° | 7 m |

Figure 4A:
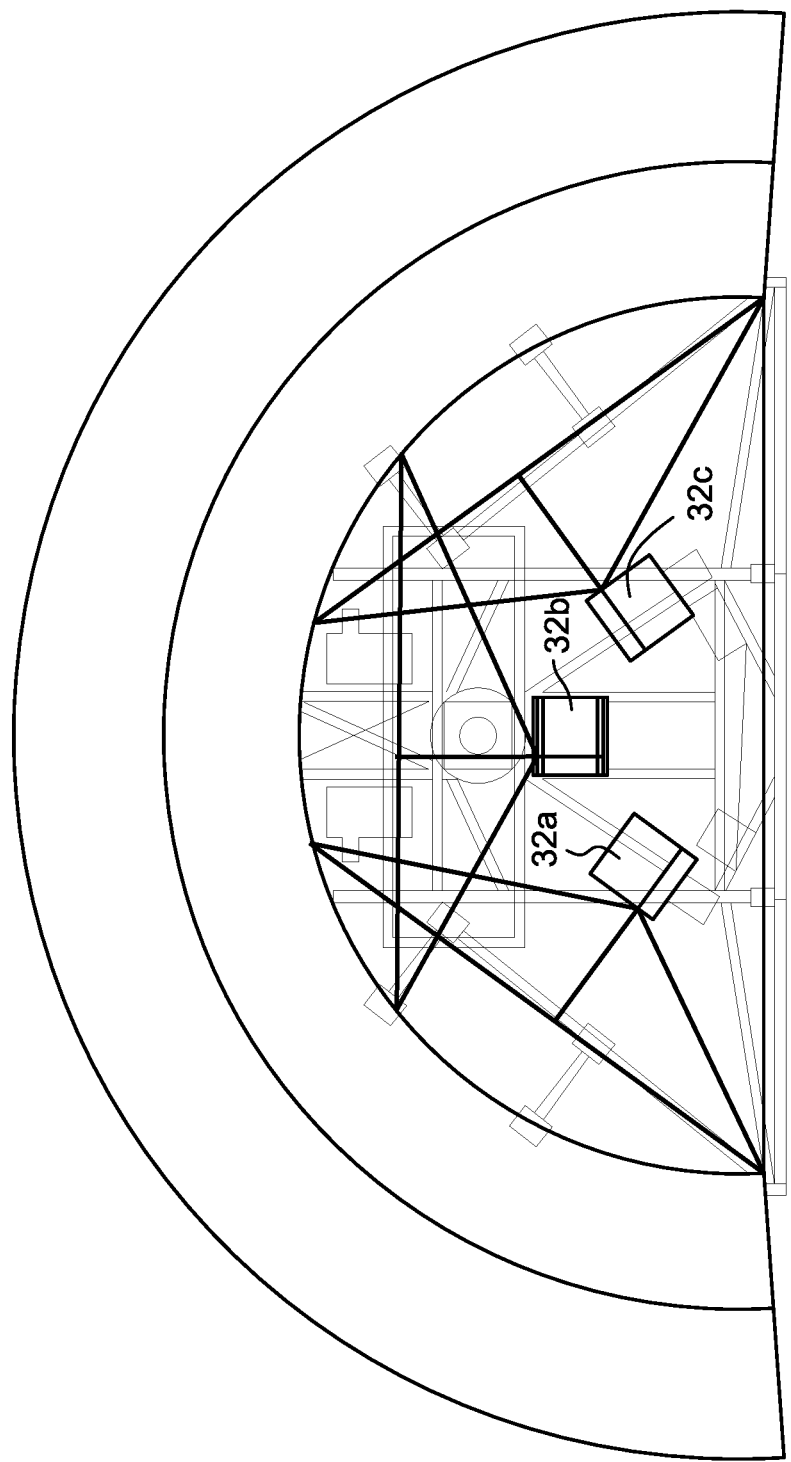
FIG. 4A shows an example mechanical arrangement of projectors and spherical cap screen of SIVOR's visual system.
Figure 4B:
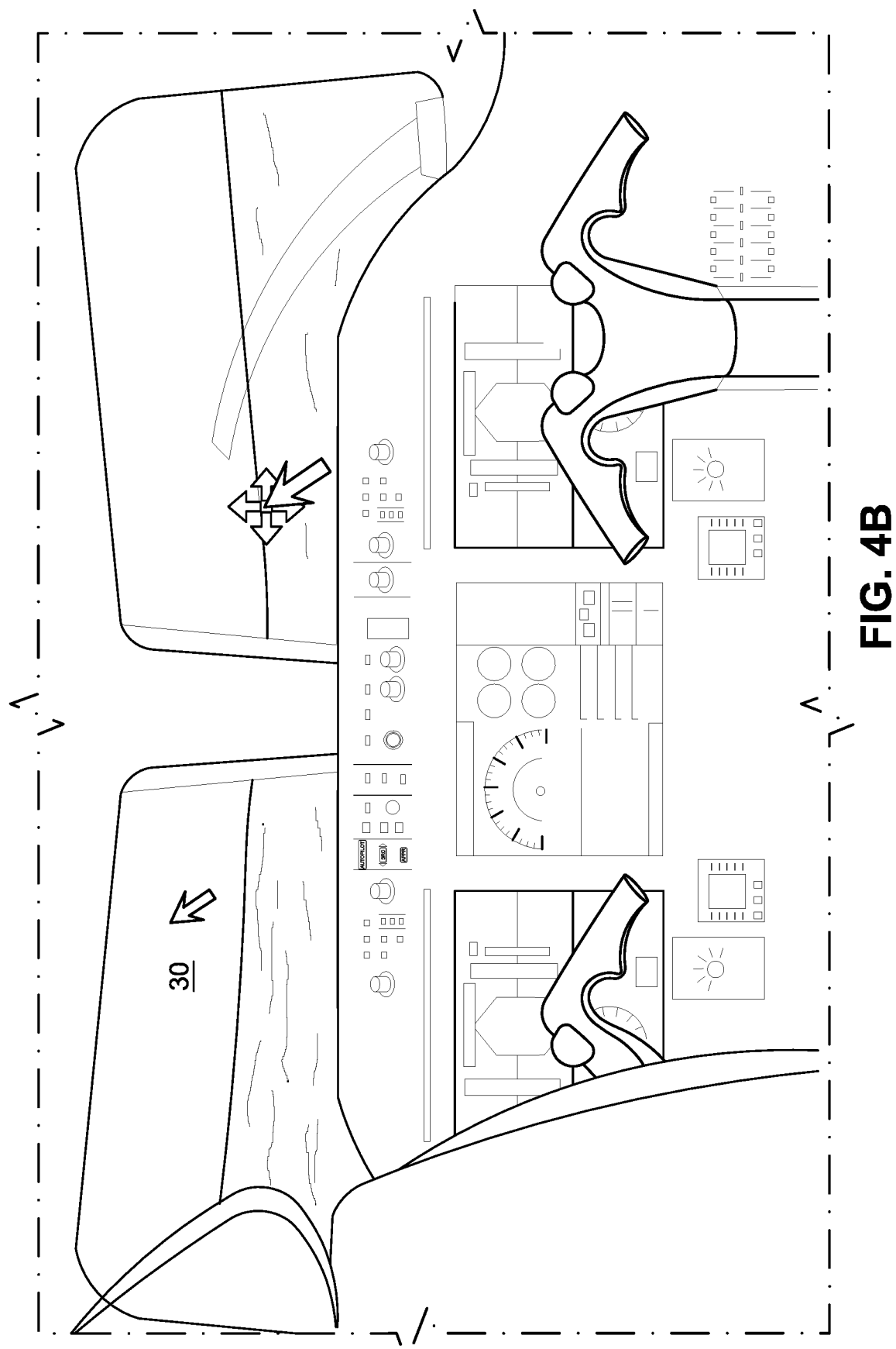
FIG. 4B shows, from inside an example cockpit, the external environment projected on the projection screen.
Figure 4C:
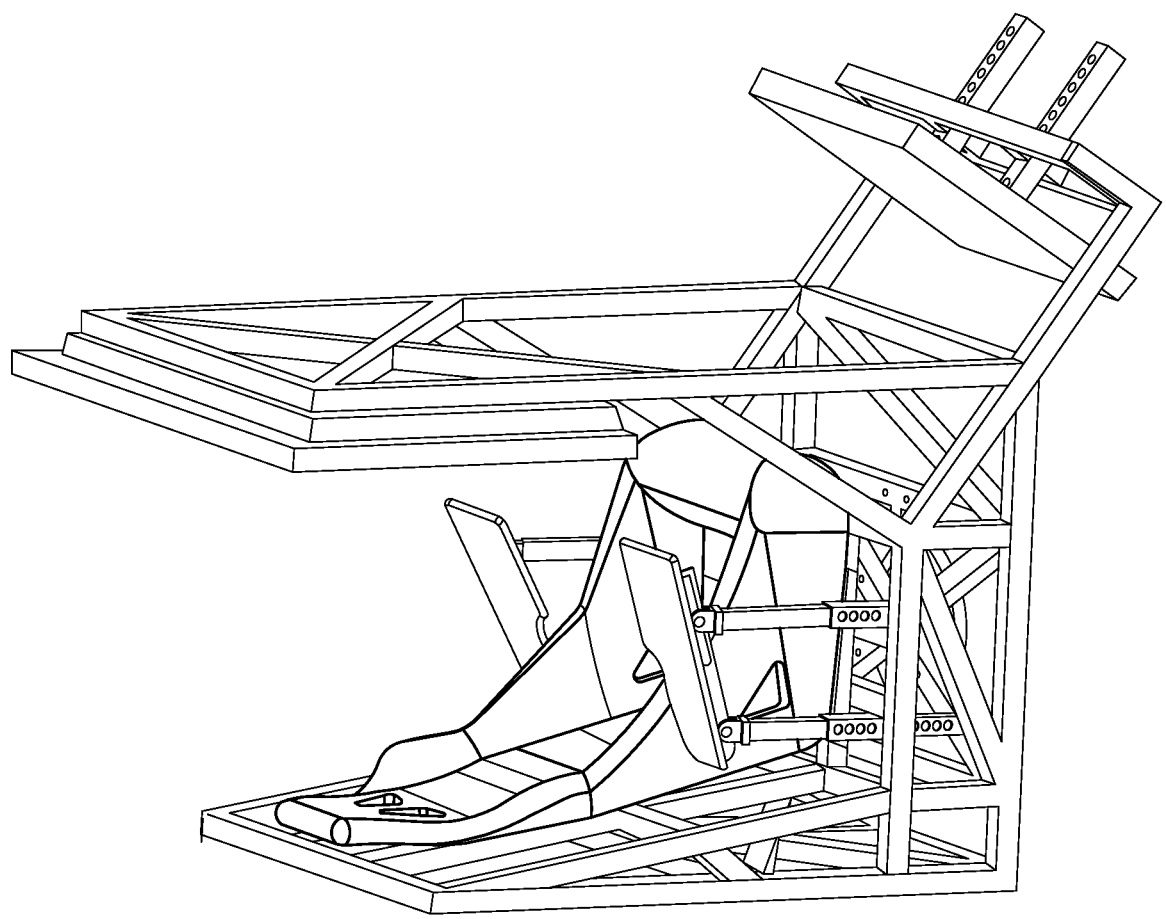
FIGS. 4C-4H show additional details of the cockpit and the projection screen.

Cockpit 20 (which is mounted to and suspended by the robotic platform 10) consists of an adaptive environment composed by simulated components and an inceptor with control loads that can reproduce an actual aircraft such as for example Embraer's Legacy 500 aircraft. The cockpit 20 systems integration extrapolates the simple component juxtaposition by providing their physical and logical integration. In addition, some supplementary functionality may also be implemented. For example, such supplementary functionality may include force feedback in pedals, side sticks and levers, in which the pilot receives feedback from the reaction of the control surfaces of the simulated airplane in a conventional manner. See FIG. 4C. The system further includes a processor and associated memory storing instructions that when executed by the processor, cause the processor to control the robotic platform 10 in response to the control inputs from the cockpit. For example, when a pilot operates an inceptor in the cockpit 20, the robotic platform 10 may respond by changing the orientation of the cockpit (e.g., pitch up, pitch down, roll, yaw, etc.) 6 DOF and path control (i.e., Robot Control, PLC Control, Motion Control e.g. KUKA.CNC and Safety Control) of the robotic platform 10 may be accomplished using conventional programming and automation components such as described in "Kuka the control system of the future KR C4" (2016 Kuka.com) and U.S. Pat. No. 10,780,587, each incorporated herein by reference. An example robotic controller for example enables direct programming and operation of robots via G-code, can process complex programs from CAD/CAM and other systems, and can provide high accuracy due to CNC path planning.

Visual system 30: In order to comply with the Level 7 and D requirement of FAA's 14 CFR Part 60 requirements for a projection screen 30' of a full flight simulator, the visual system 30 in one embodiment has, at least, 1800 in a horizontal and 400 in a vertical direction field of view. In one example embodiment, the virtual system 30 provides a panoramic semi-circular (180 degree field of view) spherical viewing surface in the direction of the horizon, with 20 degrees both up and down from the horizon. The visual system 30 designed for example embodiments has in one example a spherical cap of 4.0 meters of diameter that spans a field of view of 188° horizontal and 48° vertical. It is further separated into 4 different sections which are joined through screws and composite resin. Each screen section is directly linked to the main composite base structure through an array of carbon fiber tubes 170. See FIGS. 3, 4D, 4E, 4F, 4H. The tubes 170 provide a lightweight support structure attached to robotic arm 10 that supports the screen 30' in a spherical wrap-around configuration and maintains constant distance between the screen and the viewpoints of the pilots within the cockpit 20 irrespective of movement and repositioning of the robotic platform 10. In one embodiment, the visual system 30 support structure is mounted to the robotic arm 10 but not to the cockpit 20 so that the same visual system can be used interchangeably with multiple different types of cockpits for simulating different aircraft. See FIG. 10. As FIG. 4B shows, the visual system 30 simulates a panoramic view of the environment outside the cockpit 20 so that pilots looking out the windows of the cockpit see a realistic simulated view of the world outside the cockpit (e.g., runways, terrain, clouds, other aircraft, fog, etc.)

In one non-limiting embodiment, the visual system 30 comprises a set of projectors 32a, 32b, 32c and a projection screen 30', designed to have provision for complying Level 7 and D requirement of FAA's 14 CFR Part 60 flight simulator, and both embedded in the integrated robot and cockpit system, optimally designed in terms of weight and gravity of center positioning.

In one embodiment shown in FIGS. 2, 3, 4A, 4F and 5, three connected projectors 32a, 32b, 32c guarantee the uniformity of the generated external images. The visual system 30 in one embodiment has the capability of merging images and unwarping warped images to compensate for visual distortion caused by the projectors and/or the screen 30'. See FIG. 9. The size of the projection screen 30', especially the vertical direction, is linked to the minimum projection lens distance in one embodiment to ensure sufficient light intensity and reduce defocusing.

Supervisory system 40 comprises the physical and logical integration between the robot 10, the cockpit 20 and visual systems 30. The supervisory system 40 provides communication in real time and safeguards to guarantee simulator integrity. Considering only two of these systems and its inherent complexity, namely: the aircraft model and the supervisory system, many concerns regarding reliability and safety are addressed. Additionally, the highly coupled architecture and the impossibility to model the entire system of systems would be a favorable environment for detrimental emergent behaviors. This scenario has paved the way for a design approach called Quick Responsive Development and continued evolving strategy.

Figure 2:
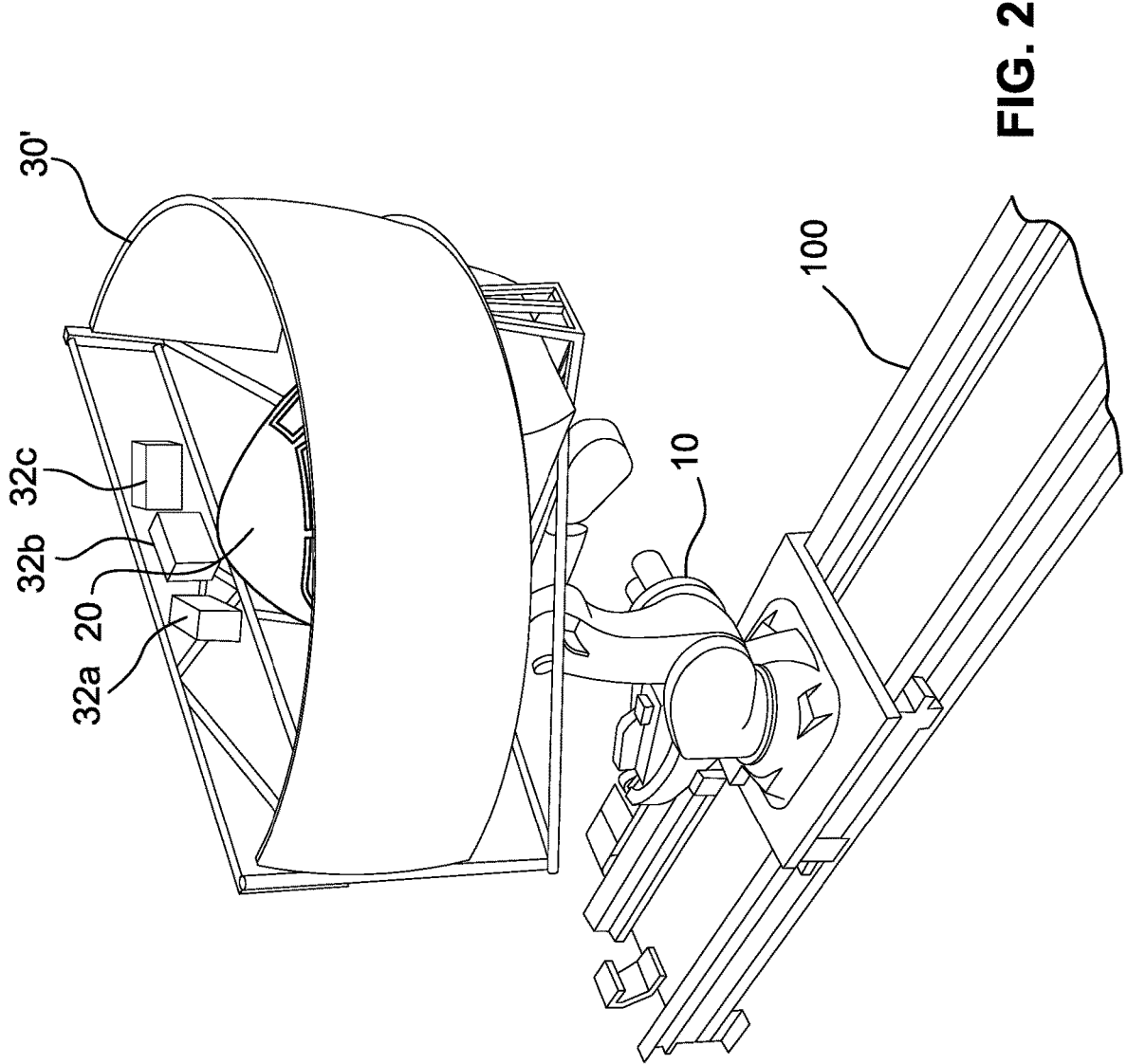
FIG. 2 is a Global View of an example non-limiting Visual System at the Robotic Manipulator.

FIG. 2 shows an example embodiment presented as a robotic manipulator 10 with a cockpit 20, scale one to one, of an aircraft such as an Embraer business jet, and the visual system 30. In this figure is presented each element that composes the robotic flight simulator. A rail 100 is designed to give a high fidelity acceleration at the pilot body. Item 10 is an off the shelf robotic arm, here a KUKA KR 1000, having payload of 1 ton. Item 30 is the flight simulator screen, which is integrated at the robotic arm 10. Item 20 is the real cockpit of for example an Embraer business jet. Items 32 is a set of three projectors 32a, 32b, 32c responsible to project the image on the spherical screen 30. Other embodiments can use different numbers of projectors 32, or other display technology such as making the screen 30' out of OLED technology. In this example, the screen is curved and configured as a semicircle or a portion of a cylinder to provide a panoramic ("wraparound") view.

Figure 3:
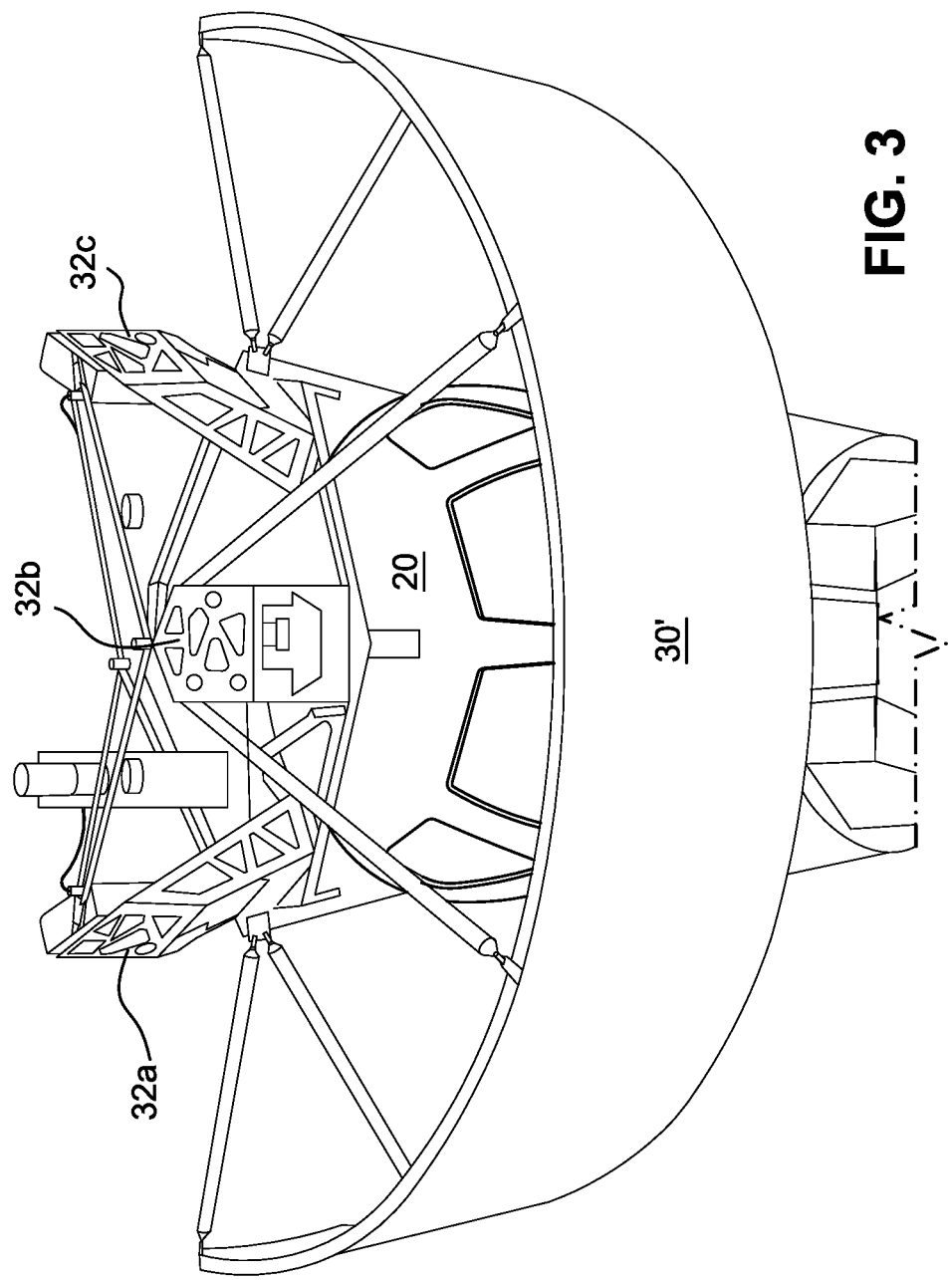
FIG. 3 shows an example non-limiting SIVOR visual projection system.

The visual system 30 of the Flight Simulator shown in FIG. 3 is designed to be a lightweight solution compactly coupled around the simulator's cockpit 20 to be fully coupled in a robotic arm 10 to provide an embedded out-of-the-flight deck view, being able to be jointly moved with the remaining portions of the system along with the flight simulation. Three projectors 32 (e.g., Barco F50 WUXGA), each one using an ultrashort lens (e.g., Barco EN57), are tied to the simulator's mechanical frame to provide a short distance projection lower than 1939 mm. See Barco, "F50 WQXGA Compact 120 Hz, single-chip DLP projector with WQXGA resolution" (17 Jun. 2019).

The projectors 32 are in one embodiment mechanically arranged with a spherical cap projection screen 30 that spans a continuous visual field-of-view of 188° horizontally and 400 vertically, centered on the zero degree azimuth line relative to the aircraft fuselage on the mid-symmetry plane of the cap, being therefore fully compliant with Level 7 requirement of FAA's 14 CFR Part 60. An example mechanical arrangement is depicted in 3, FIG. 4A, 4D, 4E, 4F, 5.

Figure 5:
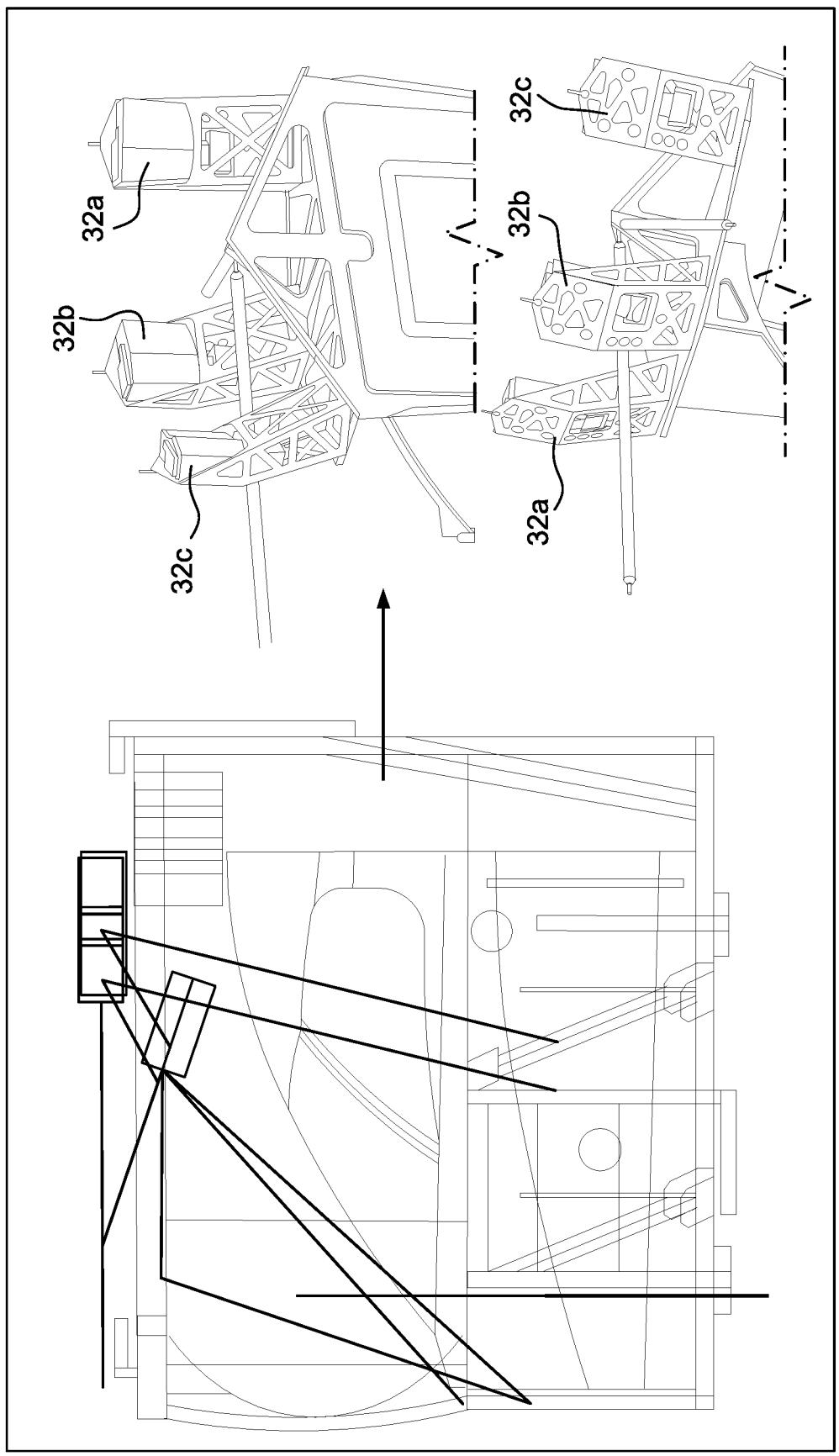
FIG. 5 shows example mechanical cases to support projectors in an upside-down position.

FIG. 4B shows, from inside the cockpit 20, the external environment projected on the projection screen 30. To suit the standard light beam projection direction of the commercial-of-the-shelf projectors 32 to the required mechanical arrangement of the visual projection, special lightweight mechanical support cases, fully manufactured in carbon fiber, are designed to support the projectors in the upside-down position, as depicted in FIG. 5.

Figure 4D:
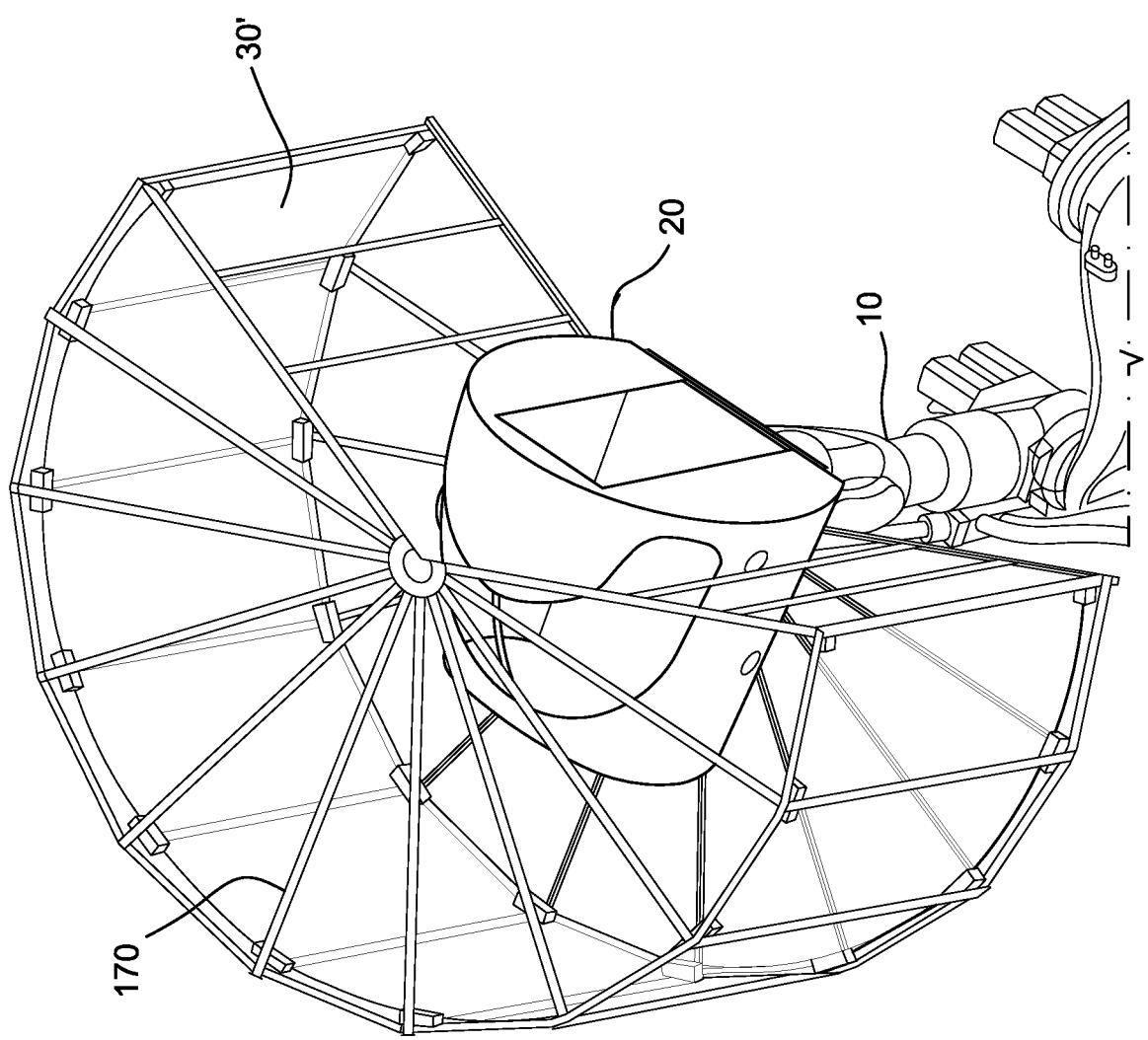
Figure 4E:
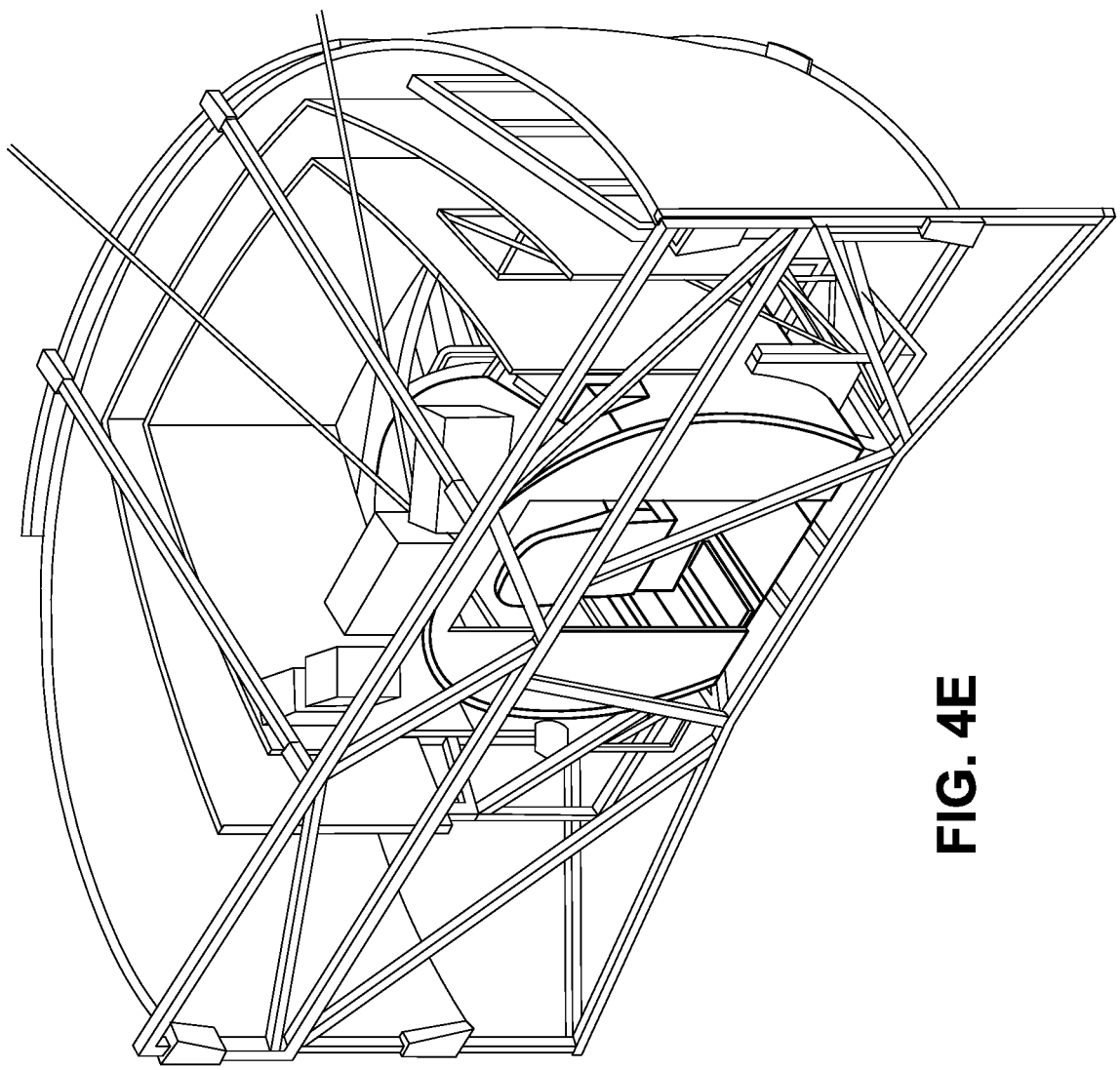
Figure 4F:
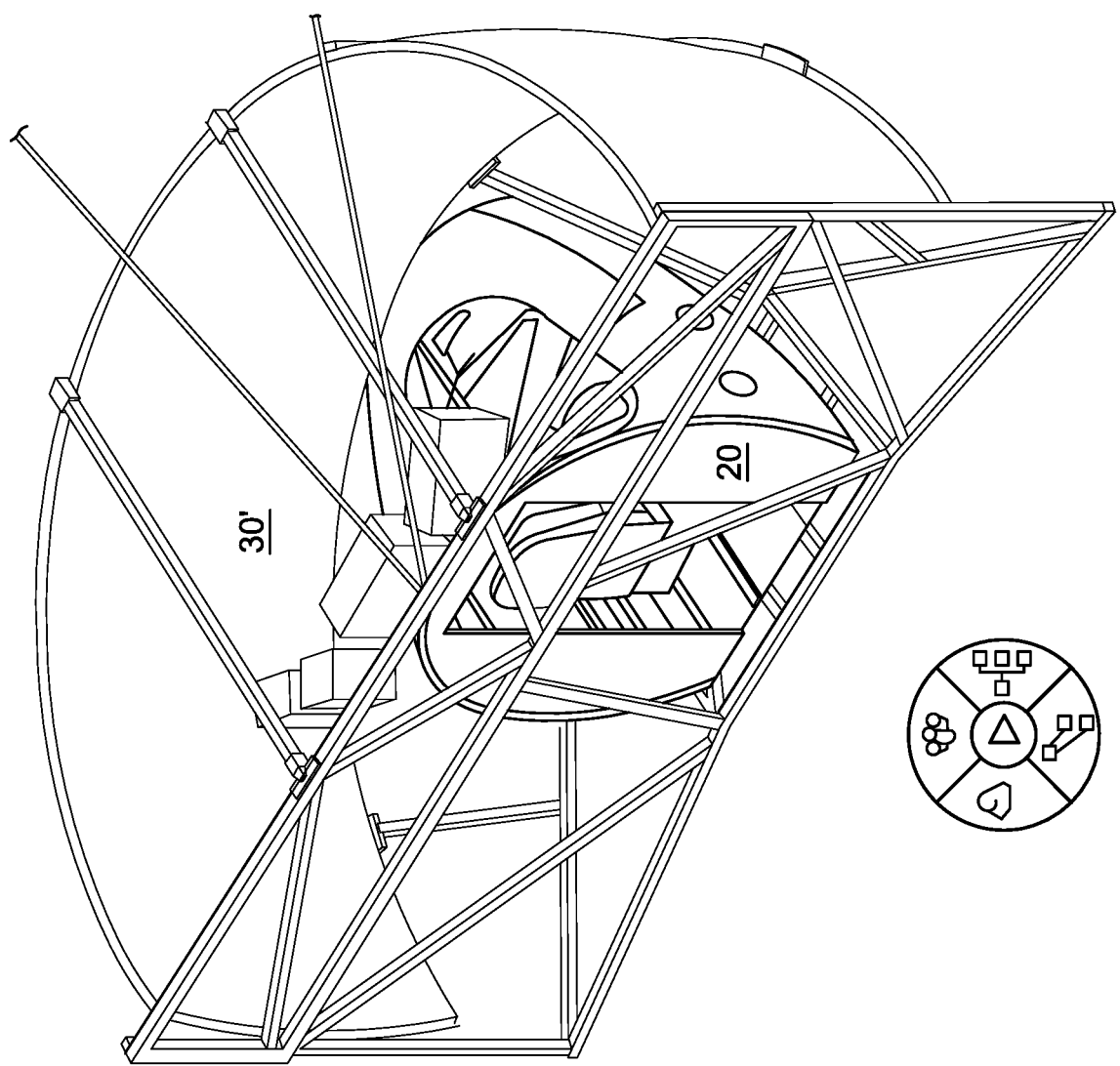
Figure 4G:
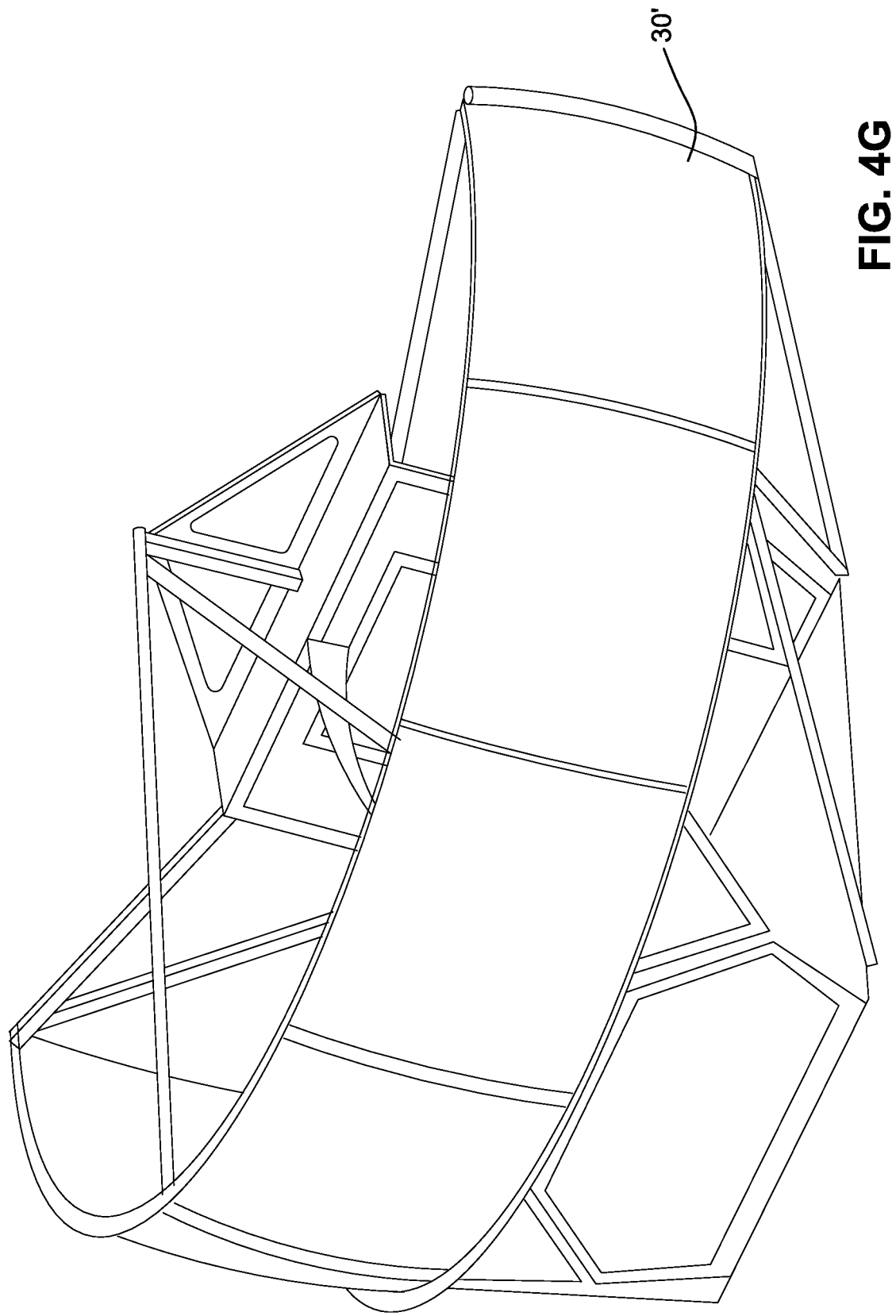
Figure 4H:
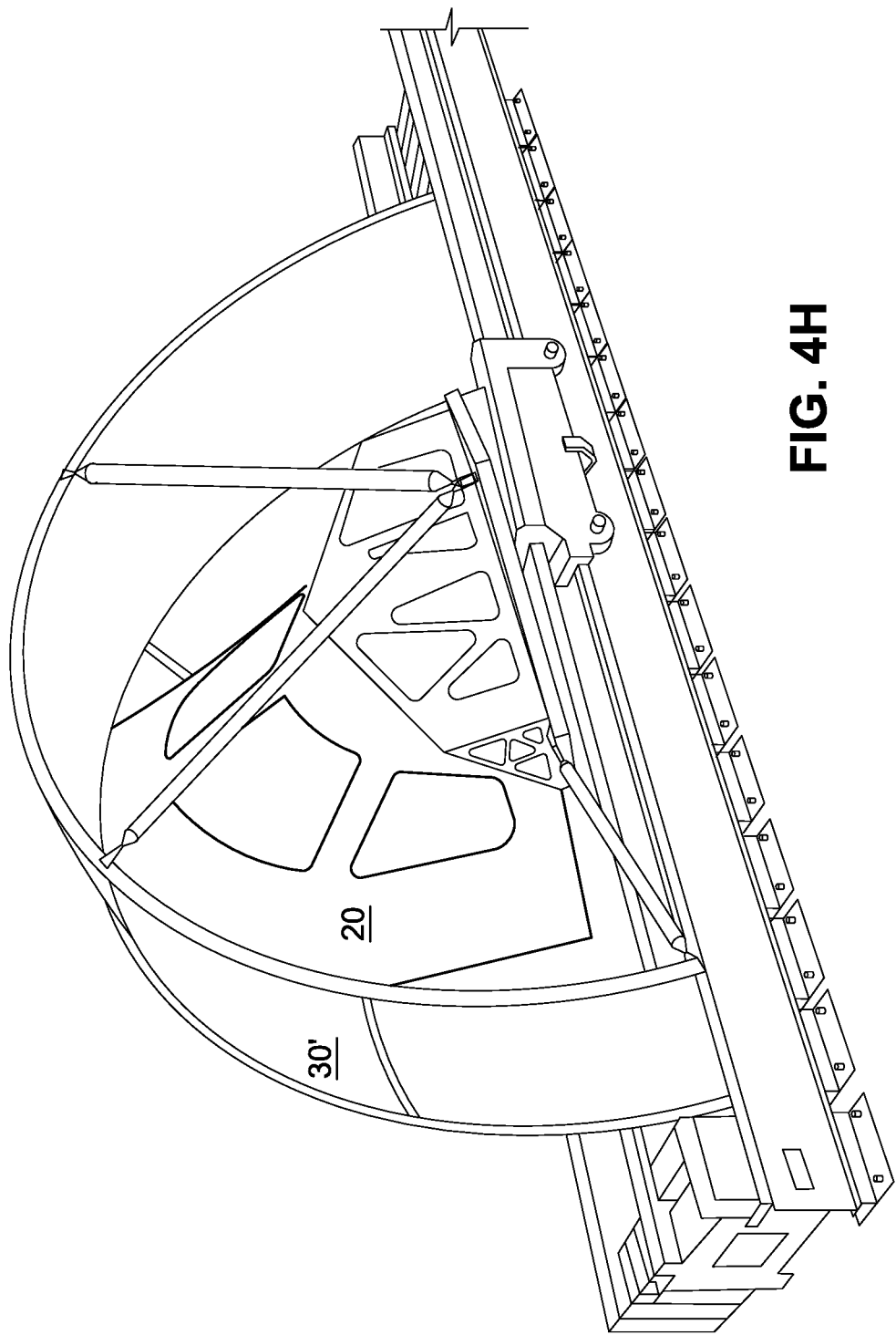
Figure 6:
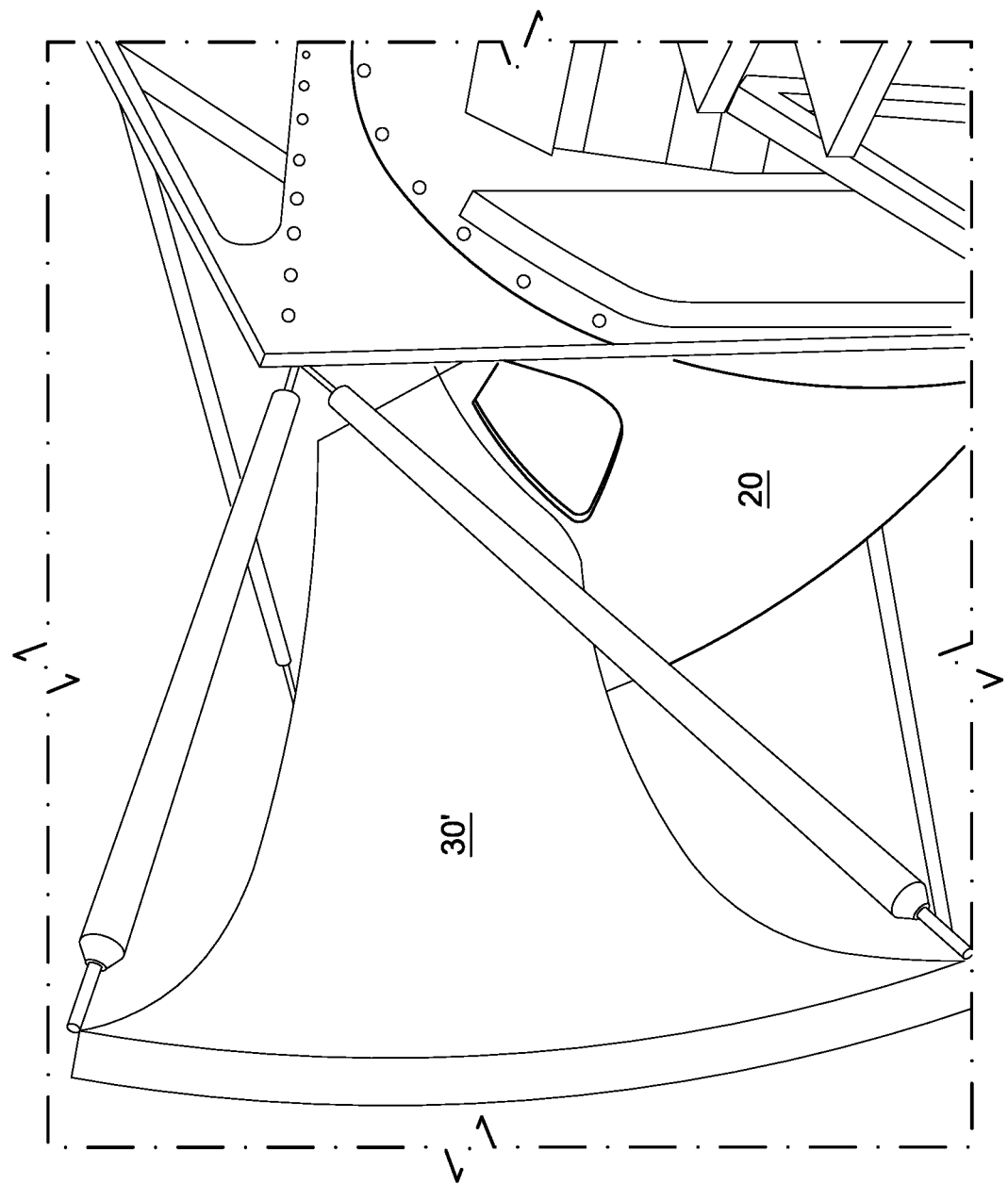
FIG. 6 shows example mechanical integration of the visual system.

To comply with lightweight requirements, the visual system 30 mechanical structure may be fully manufactured from composite material, with the screen divided into six 31.3° horizontally pieces that are appropriately mounted along with the mechanical integration, as depicted in FIGS. 4D, 4G and 6.

Figure 7:
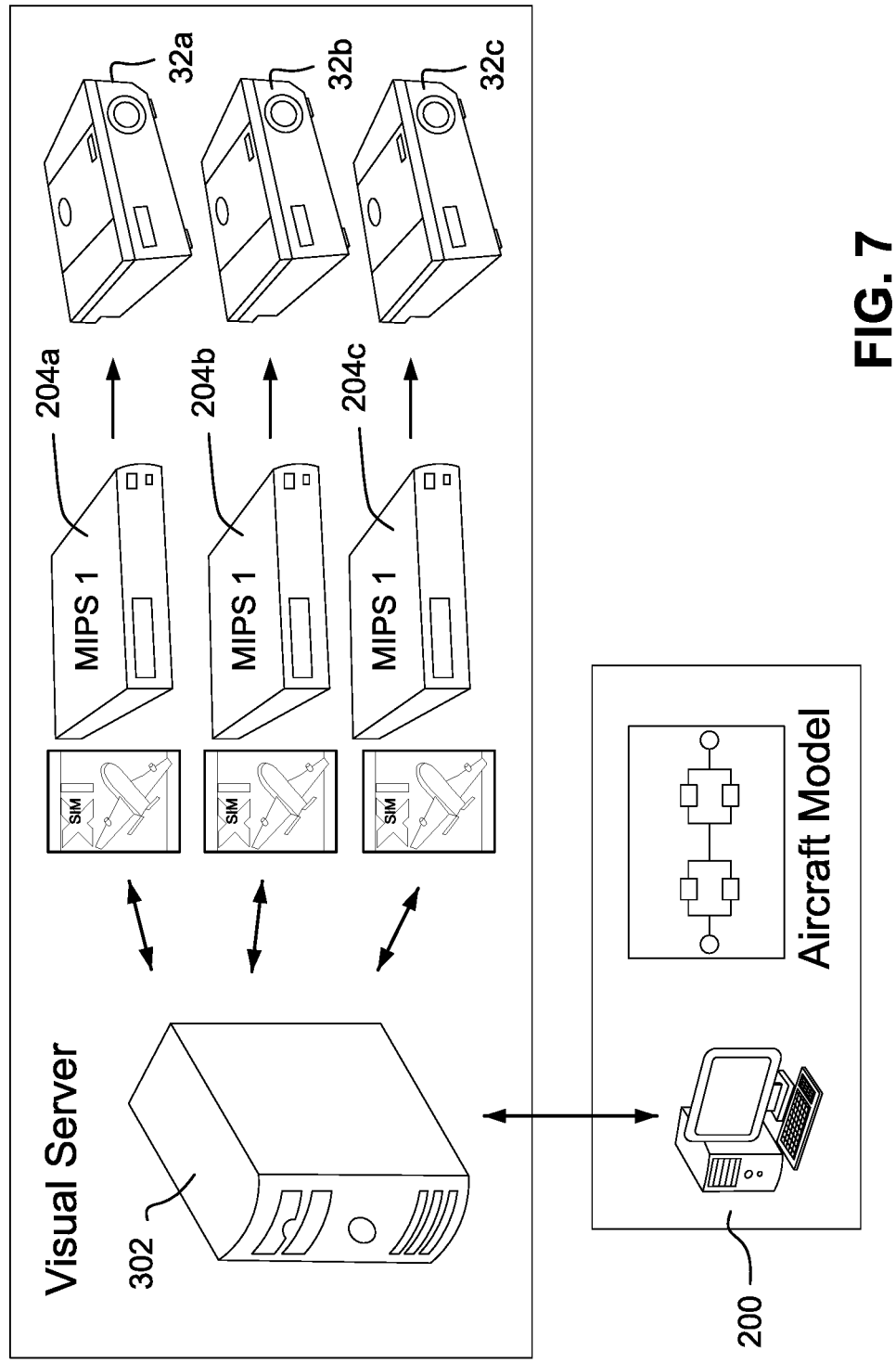
FIG. 7 shows an example software layer architecture of the visual projection system.

From the system's perspective, in the software level, the aerodynamic model, which runs from an independent engine-software apart in a special computer 200, feeds a visual server computer 202, which runs three parallel instances of a commercial-off-the-shelf visual engine software (X-Plane 10), as depicted in FIG. 7. The visual server 202 for example maintains a common 3D model of a virtual world, and responds to inputs from inceptors and other controls within cockpit 20 as well as to commands or sensors indicating the current position and orientation in 7 DOF of the robotic arm 10.

Each of these visual engine software instances feeds an independent commercial-off-the-shelf image microprocessor (MIPS) 204 that renders the visual projection for a specific projector 32. The microprocessors 204 include memories storing instructions that when executed by the microprocessors, control the microprocessors to generate and correct images for display by the projectors 32. Each microprocessor 204 (which may also comprise a conventional graphics processing unit including a 3D graphics rendering pipeline) produces a portion of a panoramic image and sends that panoramic image portion to the projectors 32 for display.

Figure 8:
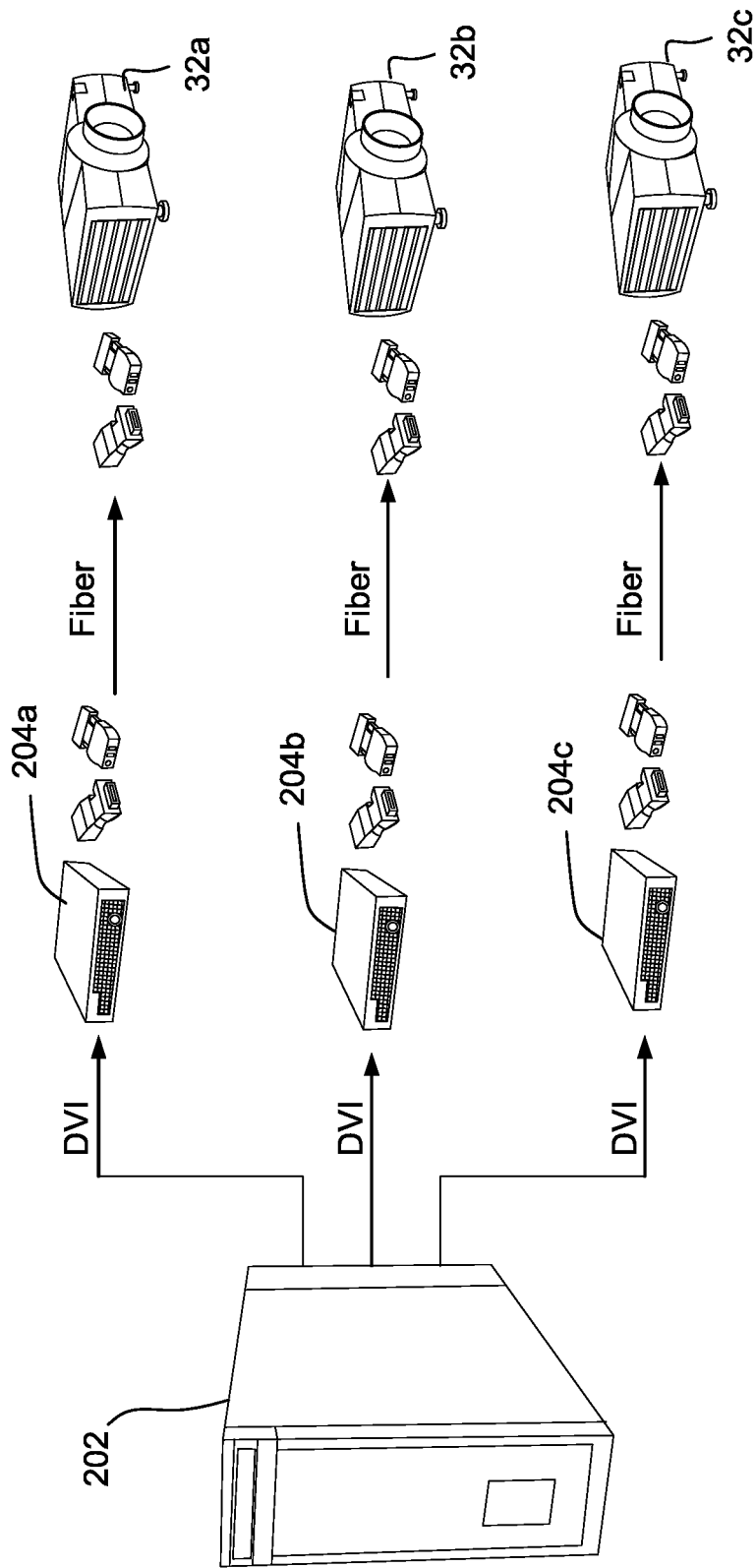
FIG. 8 shows an example hardware level architecture of the visual projection system.

On the hardware level, the visual server computer 302 feeds the three MIPS 204a, 204b, 204c in parallel through a multichannel DVI or other interface, which then devotedly render the projection for each projector 32a, 32b, 32c and sends the appropriate image signal to them through an optical-fiber pair interface, as depicted in FIG. 8.

Figure 9:
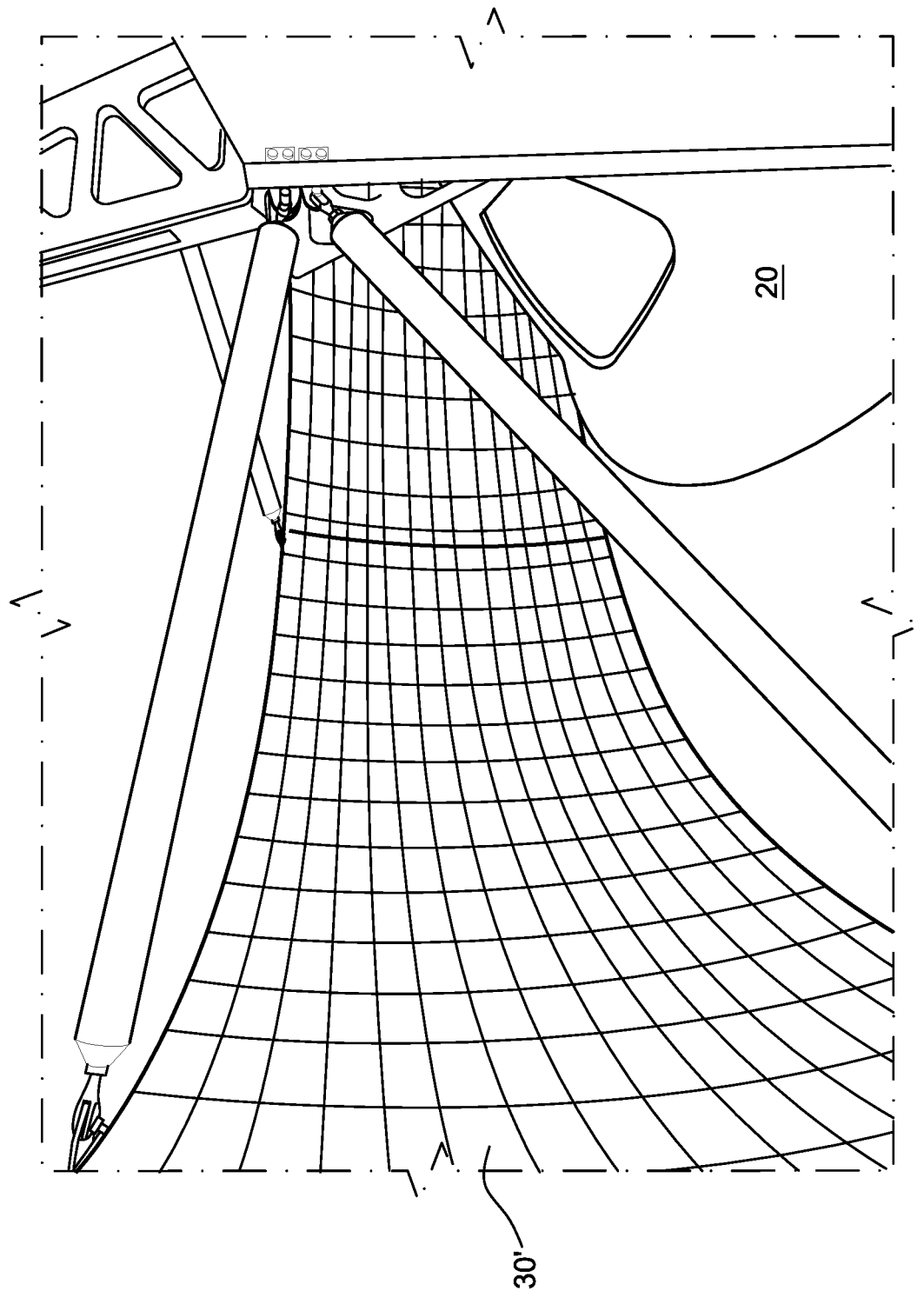
FIG. 9 shows an example visual blending-warp adjustment along with visual system integration.

Each MIPS 204 runs a dedicated programmable firmware that performs blending-warp routines to ensure synchronization, smoothness overlap and the continuity of the final projection among the three projectors 32a, 32b, 32c over the spherical cap field-of-view of 188° horizontally and 40° vertically. Such techniques provide a seamless panoramic image for display on screen 30'. The adjustment of the blending-warp, using the aforementioned software and hardware setup, onto the projection mechanical setup is carried out as a final integration step, as depicted in FIG. 9 showing a test grid displayed on screen 30' that can be used for calibrating the blending warp algorithms.

Figure 10:
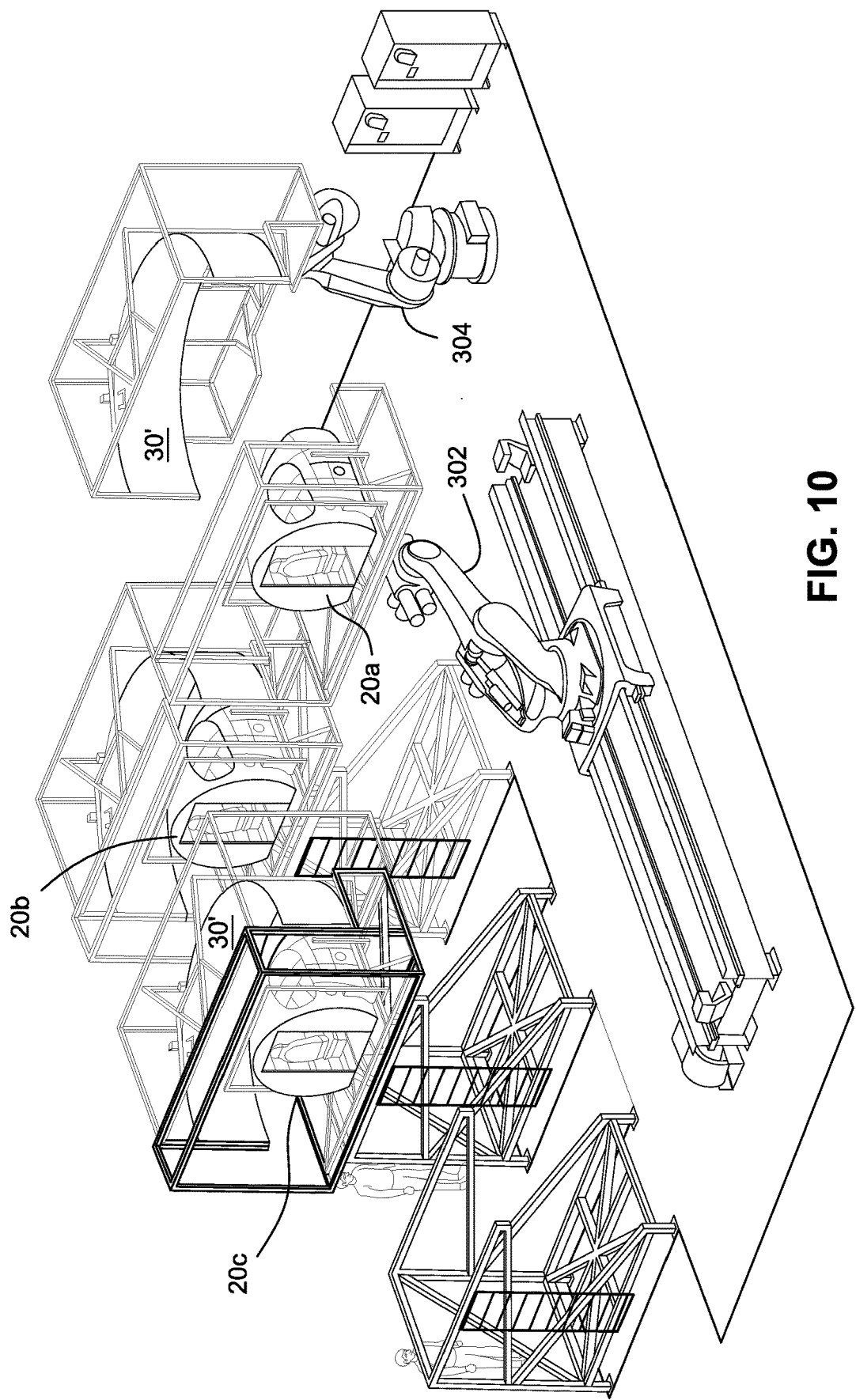
FIG. 10 shows an example Cooperative Robotics Flight Simulators.

FIG. 10 shows an alternative embodiment which comprises a modular system including two robots 302, 304. Due to the simplicity flight simulator concepts, the flight simulator may be used in a potential flight simulator training center, in such a way different types of cockpits 20 and equivalent configurations software might be set up in very efficient and fast manner. For example, different cockpits 20 modelling different aircraft can be interchangeably swapped in and out for use with a common display system 30 and robotic system 10. In the example shown, a frame supporting display screen 30' can be modularly interchangeably attached to a frame supporting a cockpit 30. Alternatively, each different integrated combination of cockpit 20 and display system 30 may be used with a common robotic platform 10.

Alternatively, the flight simulator may use cooperative robotic system in order to allow one robot dedicated to the motion based functions (comprising the cockpit) and the other robot dedicated to the screen based functions. For example, FIG. 10 shows one robotic platform 304 that supports and positions the visual system 30 and another robotic platform 302 that supports and positions the cockpit 20. Such alternative using cooperative robotic system may be applied when payload limitation becomes critical or important.

Additional Potential Application:

Upset Recovery application. Example implementations of this type of flight simulator have more degrees of freedom than a traditional Stewart Platform based flight simulator, and—when integrated with a high-fidelity visual system—the potential to evaluate the pilot reaction and support the validation of modern techniques of aerodynamic coefficients in this flight condition is extremely high.

Furthermore, the technology herein provides a disruptive visual system 30 which complies with Level 7 requirement of FAA's 14 CFR Part 60 requirements. This technology integrates an optimal structure that allows assembly—in a flight simulator—of a screen complying with the Level 7 requirement of FAA's 14 CFR Part 60 requirements.

All patents and publications cited above are incorporated by reference.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A flight simulator comprising:
an aircraft cockpit;
a robotic arm providing 7 DOF, the robotic arm supported on a linear rail and configured to support a wraparound display at least partially surrounding the cockpit, the wraparound display comprising a spherical viewing surface that is moveable with the robotic arm;
a tubular support structure connected to support the spherical viewing surface and configured to maintain spacing between the spherical viewing surface and viewpoints of pilots within the cockpit irrespective of movement and repositioning of the robotic arm, the tubular support structure mounted to the robotic arm but not to the cockpit and being movable with the robotic arm; and
a set of projectors that project images onto the spherical viewing surface.

2. The flight simulator of claim 1 wherein the wraparound display provides at least 180 degrees field of view horizontally and at least 40 degrees field of view vertically.

3. The flight simulator of claim 1 further comprising a visual server that provides plural outputs to display on different portions of the wraparound display and the flight simulator includes at least one processor that ensures the plural outputs seamlessly mesh together without distortion, the at least one processor being configured to unwarp and blend images to compensate for visual distortion caused by the projectors and/or the wraparound display.

4. The flight simulator of claim 1 wherein the display complies with Level 7 of FAA's 14 CFR Part 60 requirements.

5. The flight simulator of claim 1 wherein the robotic arm is configured to interchangeably support a plurality of different cockpits none of which are attached to the wraparound display.

6. A flight simulator comprising:
an aircraft cockpit;
a robotic arm providing 7 DOF, the robotic arm supported on a linear rail and configured to support a wraparound display at least partially surrounding the cockpit, the wraparound display comprising a spherical viewing surface that is moveable with the robotic arm;
a mechanical support structure connected to support the spherical viewing surface and configured to maintain spacing between the spherical viewing surface and viewpoints of pilots within the cockpit irrespective of movement and repositioning of the robotic arm, the mechanical support structure mounted to the robotic arm but not to the cockpit; and
a set of projectors that project images onto the spherical viewing surface,
wherein the wraparound display comprises plural screen sections supported by composite tubular supports.

7. A flight simulator comprising:
an aircraft cockpit;
a robotic arm providing 7 DOF, the robotic arm supported on a linear rail and configured to support a wraparound display at least partially surrounding the cockpit, the wraparound display comprising a spherical viewing surface that is moveable with the robotic arm;
a mechanical support structure connected to support the spherical viewing surface and configured to maintain spacing between the spherical viewing surface and viewpoints of pilots within the cockpit irrespective of movement and repositioning of the robotic arm, the mechanical support structure mounted to the robotic arm but not to the cockpit; and
a set of projectors that project images onto the spherical viewing surface,
wherein the wraparound display is supported by composite material.

8. A method of simulating flight comprising:
supporting a spherical viewing surface on a robotic arm with a support structure that is connected to the robotic arm but not to a cockpit, the support structure being movable with the robotic arm in response to inputs from cockpit controls, changing the position and/or orientation of the robotic arm and the spherical viewing surface supported thereon while maintaining uniform spacing between the spherical viewing surface and the cockpit as the robotic arm moves in seven degrees of freedom;

in response to inputs from the cockpit controls, generating images of a virtual environment around the cockpit; and projecting the generated images onto the spherical viewing surface for viewing from the cockpit, wherein projecting comprises using plural projectors to display the generated images on the spherical viewing surface supported by a tubular structure not connected to the cockpit.

9. The method of claim 8 further including compensating for distortion by image warping in displaying the generated images.

10. The method of claim 8 wherein projecting comprises using plural projectors to display the generated images on the spherical viewing surface supported by a composite tubular structure not connected to the cockpit.

11. A method of simulating flight comprising:

using a tubular support structure to support a spherical display screen on a robotic arm, the support structure being connected to the robotic arm but not to a cockpit, the support structure being movable with the robotic arm;

in response to pilot inputs via cockpit controls, controlling the robotic arm to change the position and/or orientation of the robotic arm and the spherical display screen supported thereby while maintaining uniform spacing between the spherical display screen and the cockpit as the robotic arm moves in seven degrees of freedom;

in response to the pilot inputs via the cockpit controls, generating images of a virtual environment around the cockpit using a processor performing blending warp routines to ensure synchronization, smoothness overlap and continuity of projection among plural projectors; and using the plural projectors to project the generated images onto the spherical display screen for panoramic viewing by a pilot within the cockpit.

12. A method of simulating flight comprising:

using a robotic arm to support a pilot and controls;

in response to pilot inputs via the controls, controlling the robotic arm to change the position and/or orientation of the robotic arm and the pilot supported thereby; and in response to the pilot inputs via the controls, generating images of a virtual environment around the cockpit and displaying the generated images on a wraparound panoramic display at least partially surrounding the pilot, wherein the pilot's viewpoint of the wraparound panoramic display changes as the robotic arm moves the pilot relative to the wraparound panoramic display, further including independently moving the wraparound panoramic display with a second robotic arm.

13. The method of claim 11 wherein projecting comprises using plural projectors to project the generated images onto the spherical display screen.

14. The method of claim 11 wherein controlling the robotic arm controls the position and orientation of the spherical display screen in 7 degrees of freedom.

\* \* \* \* \*